United States Patent [19]

Wise et al.

[11] 4,361,355
[45] * Nov. 30, 1982

[54] PARKING TICKET COLLECTION APPARATUS

[75] Inventors: Louis Wise, Homewood; James E. Voves, Chicago, both of Ill.

[73] Assignee: Jeffrey M. Morris, Chicago, Ill.

[*] Notice: The portion of the term of this patent subsequent to Apr. 21, 1998, has been disclaimed.

[21] Appl. No.: 214,447

[22] Filed: Dec. 8, 1980

Related U.S. Application Data

[63] Continuation of Ser. No. 108,943, Dec. 31, 1979, Pat. No. 4,262,957.

[51] Int. Cl.³ .............................................. B60R 5/00
[52] U.S. Cl. .................................... 296/37.1; 232/15; 232/43.2; 296/37.16
[58] Field of Search .................... 296/1 R, 24 R, 37.1, 296/37.16; 232/15, 43.1, 43.2

[56] References Cited

U.S. PATENT DOCUMENTS

| | | | |
|---|---|---|---|
| 2,273,971 | 2/1942 | Love | 296/24 R |
| 2,941,116 | 9/1967 | McCready | 296/37.1 |
| 3,341,116 | 9/1967 | Lewis | 296/37.16 |
| 3,353,743 | 11/1967 | Amundsen | 232/15 |
| 3,640,451 | 2/1972 | Lewis | 232/43.1 |
| 4,262,957 | 4/1981 | Wise | 296/37.1 |

*Primary Examiner*—Joseph F. Peters, Jr.
*Assistant Examiner*—John A. Carroll
*Attorney, Agent, or Firm*—McCoy & Morris

[57] ABSTRACT

A parking ticket collection apparatus for use with a motor vehicle including a body having an opening and comprising container means for holding at least one ticket. The container means comprises a mid-portion, a first portion extending longitudinally from the mid-portion in one direction, and a second portion extending longitudinally from the mid-portion in another direction, opposite the one direction. The first portion comprises a top end and the second portion comprises a bottom end. An opening on the top end of the container comprises first slot means of a size adapted to permit the insertion of a ticket therethrough. The second portion comprises a bottom end which constitutes portal means and which is mounted on the container means for movement between an open and a closed position and which comprises means normally preventing the removal of the ticket from the container means when the bottom end is in the closed position and for permitting the removal of the ticket from the container means when the bottom end is in the open position. The vehicle body opening comprises second slot means of substantially the same size and configuration as the first slot means. The apparatus is preferably mounted in the trunk area of the motor vehicle wherein the first slot means is in substantial alignment with the second slot means to permit the insertion of the ticket into and through the second slot means and the first slot means and into the container means. Ticket-guiding means is provided of a size adapted to fit into the second slot means and into the first slot means for guiding the ticket into the container means. The apparatus preferably has a rectangular cross-sectional area and has the approximate dimensions of 10⅛ inches long, 5¾ inches wide, and 1½ inches deep. Drainage means is provided in the bottom end for preventing the accumulation of moisture and debris therein.

7 Claims, 3 Drawing Figures

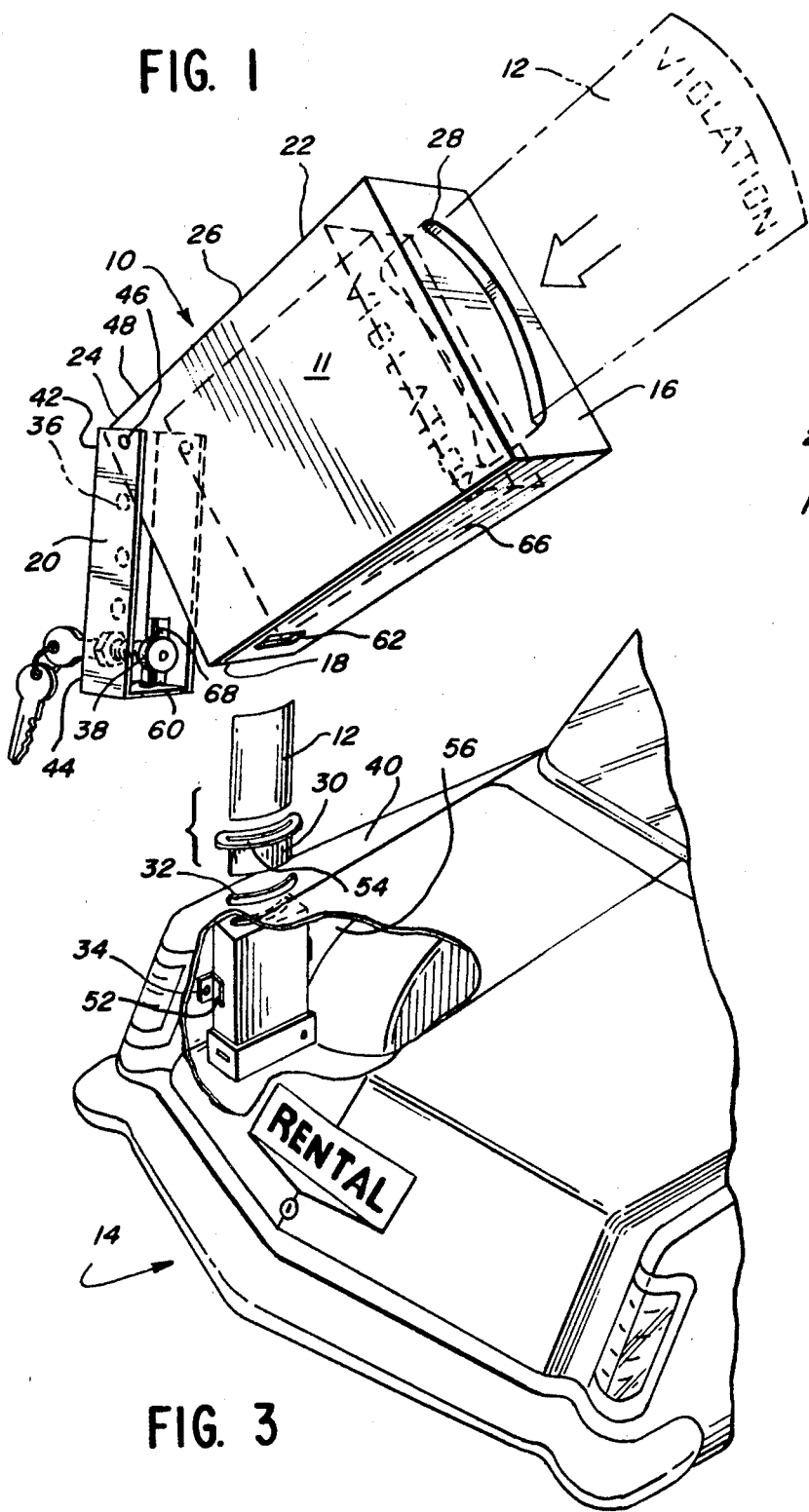

PARKING TICKET COLLECTION APPARATUS

This is a continuation of application Ser. No. 108,943, filed Dec. 31, 1979, now U.S. Pat. No. 4,262,957.

BACKGROUND OF THE INVENTION

1. Field of the Invention

The apparatus of the subject invention pertains to container means for use as a parking ticket collection apparatus which is preferably mounted within the trunk area of a motor vehicle to permit the insertion of at least one parking ticket through an opening in the outside of the vehicle body and into the container means.

2. Description of the Prior Art

Reference may be made to the following U.S. Pat. Nos.: 2,941,837; 3,292,849; 3,341,116; 3,353,743; and, 3,640,451. None of the prior art devices suggest the use of container means for use as a parking ticket collection apparatus which is preferably mounted within the trunk area of a motor vehicle to permit the insertion of at least one parking ticket from the outside of the motor vehicle into the container means and to prevent the unauthorized removal of the ticket therefrom.

Automobile rental companies are generally responsible for the payment of parking ticket fines incurred by their customers in the event that their customers do not pay the fines. Typically, at the time the vehicle is returned, the customer does not notify the rental company that a ticket was issued and the company has no practical way of knowing whether the customer has indeed received a ticket until well after the vehicle is returned. Consequently, the rental companies expend many thousands of dollars annually in the payment of parking ticket fines with little chance of reimbursement from their customers.

The municipalities issuing said tickets also loose many thousands of dollars annually by virtue of the fact that they typically settle their cases against the rental companies for the collection of the ticket fines for lump sum amounts that are less than the face value of the fines.

Obviously, there is a need for an apparatus which would permit the rental company, at the time the vehicle is returned by its customer, to verify that a ticket has indeed been issued and to thus collect the amount of the fine. The use of such an apparatus would enable the rental company to collect a reasonable deposit before the vehicle is delivered to the customer to guarantee the payment of any ticket fines incurred by the customer during the rental period.

SUMMARY OF THE INVENTION

This invention pertains to a parking ticket collection apparatus for use with a motor vehicle including a body having an opening therein. The parking ticket apparatus comprises container means for holding at least one ticket and comprises a mid-portion, a first portion extending longitudinally from the mid-portion in one direction, and a second portion extending longitudinally from the mid-portion in another direction, opposite from the one direction. The first portion comprises a top end having opening means or first slot means of a size adapted to permit the insertion of the ticket therethrough. The second portion comprises a bottom end which constitutes portal means mounted on said container means for movement between a normally closed position for preventing the removal of the ticket from the container means and an open position for permitting the removal of the ticket from the container means.

The vehicle body opening comprises second slot means of substantially the same size and configuration as the first slot means and the first and second slot means each have the configuration of an arc of a circle.

The container means is mounted to the vehicle body so that the first slot means is in substantial alignment with the second slot means to permit the insertion of the ticket into and through the second slot means and the first slot means and into the container means.

Ticket-guiding means of a size adapted to fit into the second slot means and into the first slot means is provided for guiding the ticket into the container means from the outside of the vehicle and for facilitating the mounting of the container means.

The container means has a rectangular cross-sectional area of the approximate dimensions of $10\frac{1}{4}$ inches long, $5\frac{3}{4}$ inches wide, and $1\frac{1}{2}$ inches deep. The bottom end of the container means further comprises drainage means for preventing the accumulation of moisture and debris in the container means.

The apparatus of the present invention provides for the collection of at least one parking ticket and prevents the unauthorized removal of said ticket by the rental customer. The rental companies are then able to check the contents of said apparatus at the time the vehicle is returned by the customer and charge the customer's account accordingly.

The apparatus is easily mounted within the trunk area of the vehicle and does not interfere with luggage and the like which may be placed in the trunk. The apparatus is easily unlocked and opened to retrieve any tickets contained therein, and the apparatus' sturdy tamper-proof design and structure make it difficult to damage or remove.

The apparatus is reusable, lightweight, simple in design and economical to manufacture. One size of the apparatus accommodates most motor vehicle makes and models. Use of the apparatus will save the car rental companies and municipalities many thousands of dollars annually.

These and other advantages of the invention will become apparent to those of ordinary skill in the art with reference to the further detailed description of this invention.

DESCRIPTION OF THE DRAWING

FIG. 1 is a perspective view of the parking ticket container apparatus in the open mode with a ticket partially inserted therein;

FIG. 2 is an end view of the top end of the container apparatus; and,

FIG. 3 is a partial cutaway and exploded view of the parking ticket container apparatus mounted to the inside trunk area of a motor vehicle and in substantial alignment with an opening in the body of said motor vehicle.

DESCRIPTION OF THE PREFERRED EMBODIMENT

Referring to FIG. 1, there is shown a perspective view of the parking ticket apparatus 10 which comprises container means 11 for holding at least one ticket 12. Container means 11 comprises a mid-portion 26, a first portion 22 extending longitudinally from the mid-portion 26 in one direction, and a second portion 24 extending longitudinally from the mid-portion in another direction, opposite the one direction.

The first portion 22 comprises a top end 16 and the second portion 24 comprises a bottom end 20. Container means 11 further includes an opening or first slot means 28 on top end 16 of a size adapted to permit the insertion of sleeve or guiding means 30 therethrough as well as ticket 12 and said first slot means 28 has the configuration of an arc of a circle. See, FIG. 2. The configuration of slot means 28 is needed to prevent a ticket from accidently coming out of slot means 28 once it is in container means 11. Bottom end 20 constitutes portal means which normally prevents the removal of the ticket from container means 11 after the ticket has been received therein. Bottom end 20 includes a first part 42 and a second part 44. Second portion 24 comprises a first part 48 and a second part 18. Pins 46 are provided for pivotally mounting bottom end/first part 42 to second portion/first part 48, for movement of bottom end 20 between an open position, for permitting the removal of a ticket from container means 11, and a closed position, for preventing the removal of a ticket from container means 11. Bottom end 20 also includes locking means 38 for releasably locking bottom end/second part 44 to second portion/second part 18. In the preferred embodiment of the apparatus of the present invention, locking means 38 comprises a key-activated lock which causes bar 68 to pass through opening 60 in bottom end 20 and opening 62 in second portion 24.

Container means 11 preferably comprises a rectangular cross-sectional area and has the approximate dimensions of 10⅜ inches long, 5¾ inches wide and 1½ inches deep. The apparatus is preferably made out of heavy gage steel or the like. Holes 36 constituting drainage means are provided in bottom end 20 for preventing the accumulation of moisture and debris in container means 11 when bottom end 20 is in a locked or closed position.

Referring to FIG. 3, vehicle opening or second slot means 32 is provided in the top portion of the trunk area of vehicle body 40, and is of the same size and configuration as first slot means 28 to accommodate the insertion of sleeve 30 and ticket 12.

A plastic or rubberized sleeve or guiding means 30 is substantially the same size and configuration as first slot means 28 and second slot means 32 and is of a size to permit the insertion of ticket 12 therethrough. Guiding means 30 comprises a mid-portion, a first portion extending longitudinally from the mid-portion in one direction and a second portion extending longitudinally from said mid-portion in another direction, opposite the one direction. Sleeve 30 is first inserted into second slot means 32 and then into first slot means 28, until flange 54 rests on body 40. The first portion of ticket-guiding means 30 extends above top end 16 and the second portion of ticket-guiding means 30 extends below top end 16. Sleeve 30 helps to guide the insertion of ticket 12 into container means 11 through each of said slotted means, and also helps to align each of said slotted means during the installation of the apparatus, thus facilitating the installation procedure.

Container means 11 is preferably mounted to the inside of the trunk area adjacent to wall 56 of the trunk of vehicle 14 with suitable bolt means 34 and bracket means 52. Bracket 52 is connected by welding or the like to each sidewall 66 of the container means 11. Brackets 52 can be attached to any suitable surface of container means 11 to facilitate the mounting of the apparatus. Second slot means 32 is punched out in vehicle body 40, and first slot means 28 is then mounted in substantial alignment with second slot means 32 with the help of sleeve 30.

The apparatus may be mounted within any area of the vehicle body where space permits, such as under the hood area, so long as top end 16 is substantially adjacent any suitable horizontal or verticle vehicle body surface. Of course, if the apparatus is mounted so that top end 16 is adjacent a verticle surface, the brackets would have to be modified accordingly. In addition, the size of the apparatus could be modified to accommodate the mounting of the container in vehicles which have limited space.

In the alternate embodiment of the apparatus of the present invention, the container means is constructed so that top end 16 is entirely open and bottom end 20 is entirely closed thereby permitting the removal of ticket 12 from top end 16. The container means is releasably mounted with bracket means to any suitable vehicle body wall, to permit the detachment of container means 11 to remove the ticket. In this embodiment, container means 11 is mounted to the vehicle in the same manner as the preferred embodiment, except that top end 16 is mounted substantially contiguous to the body opening or slot as well as being aligned therewith, to prevent access to the inside of the container while it is mounted.

Another alternate embodiment of the apparatus of the present invention provides container means which is mounted on any suitable outside surface of motor vehicle 14. Top end 16, or in the aternative, bottom end 20 is pivotally mounted to first portion 22 or second portion 24, respectively, so that the ticket may be removed when the end is in the open position. Of course, locking means is provided to prevent unauthorized access to the contents of the container means.

In use, at the time the vehicle is rented, the customer is required to pay a reasonable deposit to guarantee the payment of any parking ticket fines incurred during the rental period. Upon return of the rented vehicle, the rental company would routinely check the ticket collection apparatus and charge the customer's account for any tickets found therein.

Of course, the local municipalities would have to be advised of the use of the apparatus of the present invention by the rental companies. It is not anticipated, however, that the municipalities would not cooperate with the rental companies in the use of the invention, since the local governments would stand to save thousands of dollars annually by the collection of parking fines normally settled at less than face value with the rental companies.

The foregoing description and drawing merely explain and illustrate the invention and the invention is not limited thereto except insofar as the independent claims are so limited as those who are skilled in the art and have the disclosure before them will be able to make modifications and variations therein without departing from the scope of the invention.

What is claimed is:

1. A parking ticket apparatus adapted for use with a motor vehicle, said apparatus comprising:
   container means for holding at least one ticket;
   said container means comprises a mid-portion, a first portion extending longitudinally from said mid-portion in one direction and a second portion extending longitudinally from said mid-portion in another direction, opposite said one direction;
   said first portion comprises a top end;

slot means on said top end of a size adapted to permit the insertion of the ticket therethrough and having a configuration of an arc of a circle;

means for mounting said container means to the motor vehicle;

means normally preventing the removal of the ticket from said container means after it has been received therein;

ticket-guiding means comprising a mid-portion, a first portion extending longitudinally from said mid-portion in one direction and a second portion extending longitudinally from said mid-portion in another direction, opposite said one direction; and, said ticket-guiding means of a size adapted to fit into said slot means and into said top end for guiding the ticket into said container means whereby said first portion of said ticket-guiding means extends above the top end and said second portion of said ticket-guiding means extends below the top end.

2. An apparatus as recited in claim 1 wherein said last recited means comprises:

portal means;

means mounting said portal means on said container means for movement between open and closed positions of said portal means; and, said portal means comprising means for preventing the removal of the ticket from said container means when said portal means is in said closed position, and for permitting the removal of the ticket from said container means when said portal means is in said open position.

3. An apparatus as recited in claim 2 wherein:

said second portion comprises a bottom end constituting said portal means; and, said apparatus comprises means for pivotally mounting said bottom end to said container means.

4. An apparatus as recited in claim 3 wherein:

said second portion has a first part and a second part;

said bottom end has a first part and a second part;

said pivotal mounting means comprises means for pivotally mounting said first part of said bottom end to said first part of said second portion; and, said apparatus comprises means for releasably locking said second part of said bottom end to said second part of said second portion.

5. An apparatus as recited in claim 1 wherein:

said container means has a rectangular cross-sectional area.

6. An apparatus as recited in claim 5 wherein:

said container means has the approximate dimensions of: $10\frac{1}{8}$ inches long, $5\frac{3}{4}$ inches wide, and $1\frac{1}{2}$ inches deep.

7. An apparatus as recited in claim 3 wherein:

said bottom end further comprises drainage means for preventing the accumulation of moisture and debris in said container means.

* * * * *